UNITED STATES PATENT OFFICE.

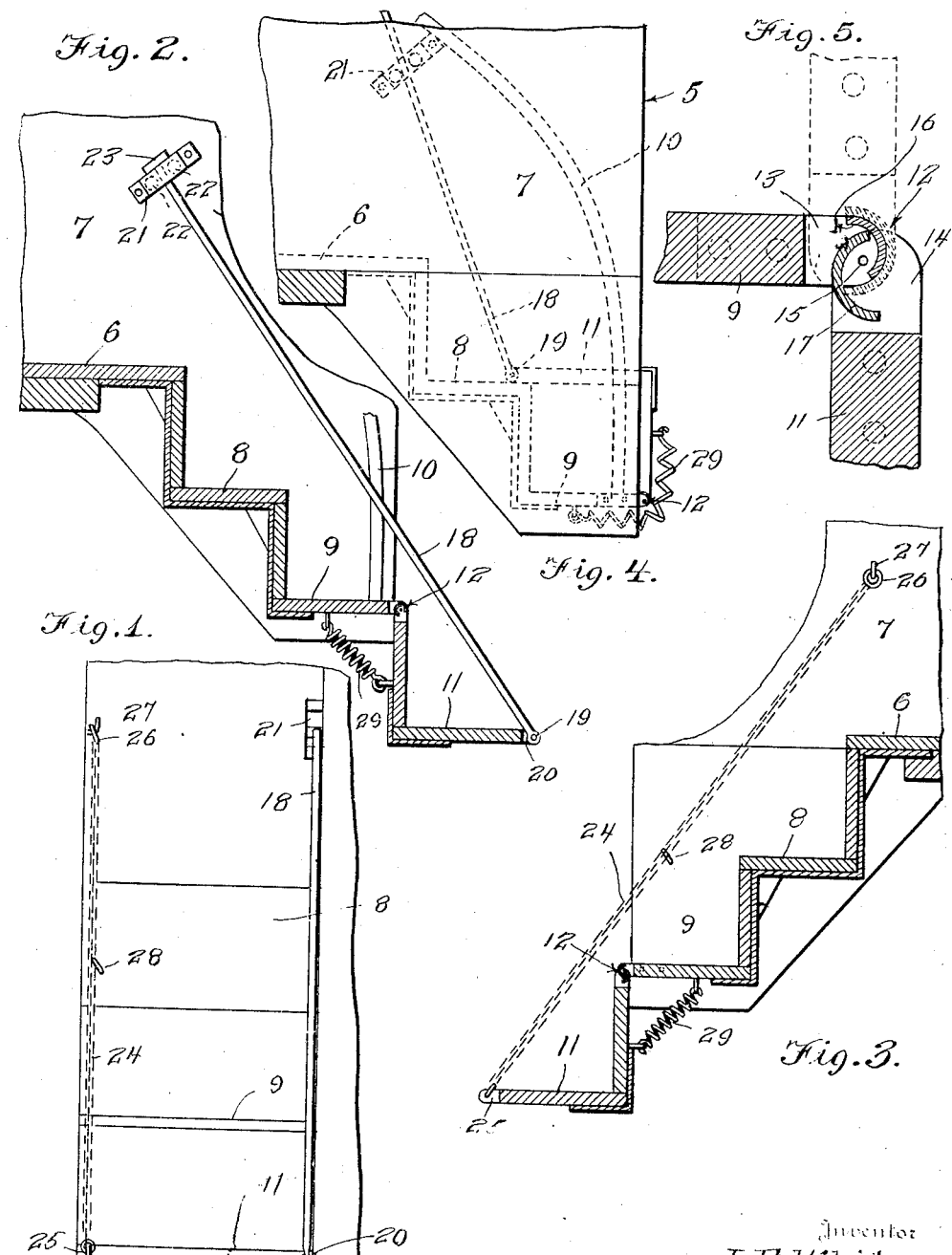

JAMES F. WHITE, OF CENTER, OKLAHOMA, ASSIGNOR OF ONE-HALF TO ELMER C. BURRESS, OF CENTER, OKLAHOMA.

FOLDING CAR-STEP.

1,112,182. Specification of Letters Patent. Patented Sept. 29, 1914.

Application filed June 3, 1914. Serial No. 842,638.

*To all whom it may concern:*

Be it known that I, JAMES F. WHITE, a citizen of the United States, residing at Center, in the county of Pontotoc, State of Oklahoma, have invented certain new and useful Improvements in Folding Car-Steps; and I do hereby declare the following to be a full, clear, and exact description of the invention such as will enable others skilled in the art to which it appertains to make and use the same.

This invention relates to cars, particularly to the steps therefor, and has for its object the provision of a novel extension step which may be folded back upon the stationary steps.

An important object is the provision of a novel step of this character which is provided with novel means whereby it may be supported and securely held when in its extended or folded position.

An important object is the provision of a novel car step of this character which will be simple in construction, cheap in manufacture, efficient and durable in use and a general improvement of the art.

With these and other objects and advantages in view, the invention consists in the novel construction, arrangement and combination of parts to be hereinafter more fully described and claimed, and illustrated in the accompanying drawing, in which—

Figure 1 is a front elevation of a portion of a car platform and steps, showing my folding step applied thereto, Fig. 2 is a vertical sectional view therethrough, looking in one direction, Fig. 3 is a similar view looking in the opposite direction, Fig. 4 is a side elevation of the step in its folded position, and Fig. 5 is a detailed view showing the hinge structure.

Referring more particularly to the drawing, the numeral 5 designates the platform of a car comprising a floor portion 6 and side walls 7. The usual stationary steps 8 and 9 are provided to the lower one of which is secured the usual hand rail 10.

My invention consists in providing an auxiliary step hinged upon the lowest stationary step, adapted to be extended for use for the alighting of passengers when the car is stationary and adapted to be folded upwardly and be disposed out of the way when the car is moving. The step 11 is hingedly secured upon the free edge of the step 9 by a peculiar form of hinge 12.

The hinge 12 comprises a pair of ears 13 secured upon the edges of the step 9 and a pair of ears 14 secured upon the edge of the step 11, the ears 13 and 14 being pivotally connected with each other as at 15. The ears 13 are connected by a curved plate 16 coöperating with a curved plate 17 connecting the ears 14. When the step 11 is in its extended position, the upper edge of the plate 17 abuts against the inner face of the plate 16 and consequently prevents downward movement of the step 11. When the step is folded, the plate 17 lies flat upon the plate 16 and prevents the step from being folded too far upwardly. As an additional support, I provide a rod 18 pivoted as at 19 between ears 20, secured upon the free edge of the step 11. The rod 18 extends upwardly in an inclined direction adjacent the hand rail 10 and extends through a bracket 21 secured upon one of the sides 7. Rollers 22 are journaled within the bracket 21 for easily guiding the rod 18 in its upward movement with a minimum degree of friction. The rod 18 is provided with a head 23 engaging the top side of the bracket 21 when the step 11 is in its extended or lowered position. In order to provide still additional supporting means and to provide means for elevating the step 11 into its inoperative position, I provide a chain 24, secured to an ear 25 upon the other edge of the step 11 and provided upon one end with a ring 26 engageable upon a hook 27 secured upon the other side wall 7, when the step is extended. The chain 24 is provided with another ring 28 for a purpose to be described. The step 11 is normally held in its extended position by a spring 29 secured to the step 9 and the step 11. When it is desired to fold the step 11 upwardly it is merely necessary to disengage the ring 26 from the hook 27, and then pull upwardly upon the chain 24 until the step 11 has been raised, after which it may be held in its raised position by engaging the ring 28 on the hook 27. When this is done, the rod 18 will slide upwardly between the rollers 22 and be disposed out of the way.

From the foregoing description and a study of the drawing it will be apparent that I have thus provided a simple and novel extensible car step which may quickly and easily be adapted for use when passengers alight.

It will be readily understood that I reserve the right to make various changes in the form, construction and arrangement of parts without departing from the spirit of the invention or limiting the scope of the subjoined claims.

Having thus described my invention, I claim:

In an extensible car step structure, an auxiliary step provided upon its ends with ears, ears secured upon the free edge of a stationary step, said ears being pivoted to each other, a curved plate connecting said first named ears, a curved plate connecting said second named ears, the upper edge of said first named plate abutting against the inner face of said second named plate when said auxiliary step is extended, a chain secured to said auxiliary step and engageable upon a stationary hook whereby said step may be elevated, a stop rod for limiting the downward movement of said auxiliary step and a bracket engaged by said stop rod, said first named curved plate lying flat upon said second named curved plate when said step is folded upwardly.

In testimony whereof, I affix my signature, in the presence of two witnesses.

JAMES F. WHITE.

Witnesses:
E. C. BURRUSS,
BURT HARDIN.